United States Patent [19]

Junkas

[11] Patent Number: 4,697,655
[45] Date of Patent: Oct. 6, 1987

[54] PORTABLE WEIGHING DEVICE

[76] Inventor: Ronald J. Junkas, 38W108 Rosewood La., Batavia, Ill. 60510

[21] Appl. No.: 926,537

[22] Filed: Nov. 4, 1986

[51] Int. Cl.[4] .................... G01G 21/28; G01G 1/18
[52] U.S. Cl. .................................. 177/127; 177/246
[58] Field of Search ............... 177/126, 127, 246, 249, 177/250

[56] References Cited

U.S. PATENT DOCUMENTS

| 1,000,201 | 8/1911 | Seton | 177/126 |
| 2,228,872 | 1/1941 | Durfee | 177/126 X |
| 2,330,746 | 9/1943 | Robinson | 177/127 |
| 2,805,850 | 9/1957 | Robinson | 177/126 |
| 2,983,326 | 5/1961 | Williams | 177/127 |

FOREIGN PATENT DOCUMENTS 1005520 4/1952 France .................. 177/246

Primary Examiner—George H. Miller, Jr.
Attorney, Agent, or Firm—John L. Schmitt

[57] ABSTRACT

A portable weighing device particularly adapted for sport fishermen includes a balancing rod which may be readily assembled from three rod sections, a set of fittings, and a receptacle forming a counterbalancing weight. When the device is not in use, the rod sections and fittings may be conveniently stored in the receptacle. To use the device the rod sections and fittings first are removed from the receptacle. The rod sections then may be screwed together to form the balancing rod. The fittings in turn are threaded into spaced apertures in a pivot end section of the rod. An object to be weighed then is attached to one of the fittings while the fitting in the other aperture serves as a pivot and point of support for the device. Next, the receptacle is filled with water to a predefined level depending on whether the weighing device is to be used in a heavy or light weighing mode. The filled receptacle then is placed on the rod and its location adjusted until the rod balances in a horizontal position. The location of the receptacle with respect to numerical values of a scale on the rod indicates the weight of the object, for example, a recently caught fish.

5 Claims, 6 Drawing Figures

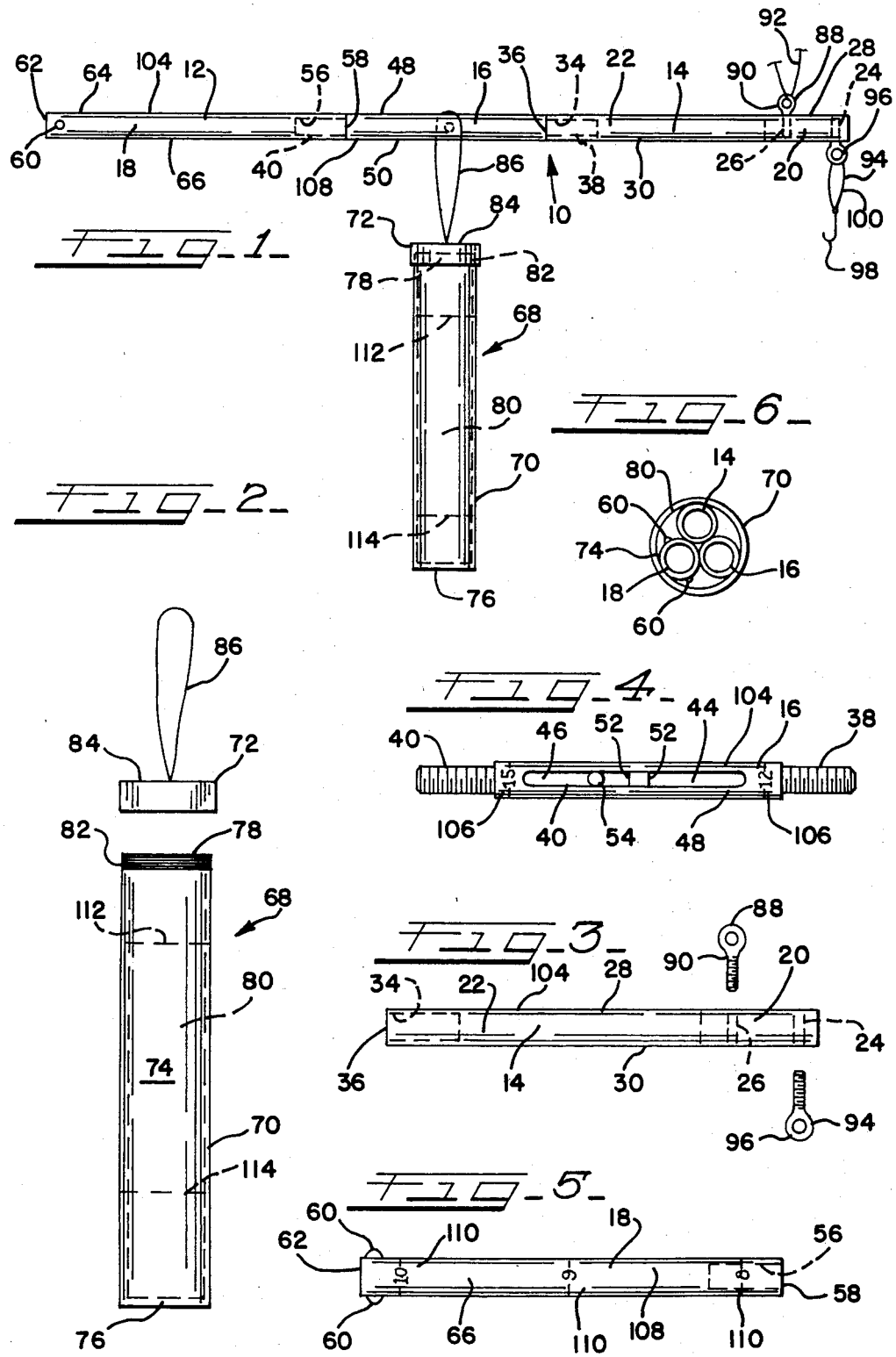

PORTABLE WEIGHING DEVICE

BACKGROUND OF THE INVENTION

1. Field of the Invention:

This invention relates to weighing devices and more particularly to a portable device which may be conveniently stored when not in use and then readily assembled into an accurate weighing instrument.

2. Prior Art:

Weight devices are well known and have been in use for thousands of years. Many such devices utilize the mechanical principle of balancing a clockwise and a counterclockwise moment of force about a pivot point. In each case the magnitude of the force moment is equal to the product of the force and the distance that the force is from the pivot point. Balancing occurs when the force moments have equal value. The structure of a particular device depends generally on whether the force and/or distance comprising a moment is fixed or may vary.

In one known weighing device, sometimes referred to as a weighing scale, weighing pans are carried respectively from ends of an arm and spaced an equal distance on each side of a pivot supporting the arm. The object to be weighed is placed in one pan while pieces of metal each having a specific known weight, i.e. weights, are placed in the other pan. Weights are selectively added until the pans balance. The weight of the object is equal to the sum of the numerical values of the weight pieces.

Another well known weighing device often found, for example, in doctors' offices and in post offices, comprises a support plate operatively connected to one end of a pivot arm. On an opposite side of the point where the arm is pivotally supported is a slidable weight. After the object to be weighed is placed on the support plate, the position of the weight is adjusted until the arm balances in a horizontal position. The weight of the object is equal to the position of the weight with respect to numerical weight values on a scale on the arm.

A still further known weighing device includes a spring operatively connected to a fitting to which an object to be weighed may be attached. The object compresses the spring to selectively position an end of the spring along a scale on the device. The weight of the object is equal to position of the spring end with respect to numerical values on the scale. Weighing devices incorporating this structure are presently available for sport fisherman use. Such devices, while not particularly accurate, are compact and may be readily stored when not being used.

SUMMARY OF THE INVENTION

A portable weighing device of this invention includes a balancing rod. The rod comprises a pivot end section, a middle section, and an outer end section. The rod middle section may include liquid-air bubble type level. These sections have complementarily formed threaded ends allowing the sections to be quickly assembled into the rod or disassembled. On one side of the balancing rod is a heavy weighing scale while a light weighing scale is on an opposite side of the rod.

The weighing device further includes an object fitting and a pivot fitting. The object fitting includes a fastener which is threaded into an aperture in the rod pivot end section adjacent to an outer end of such. The object fitting extends downward from the rod and may also include a hook for attaching the object to be weighed. The pivot fitting also includes a fastener which is threaded into another aperture in the rod pivot end section spaced inward from the object fitting aperture. This pivot fitting projects upward for supporting the weighing device rod and serves as the pivot point for balancing the rod.

Lastly, the weighing device includes a receptacle comprising a hollow container with an open end which may be selectively closed by a cap. Attached to the cap is a cord loop to fit over the rod outer end section. The receptacle serves as a counterweight to the object during use of the device.

When the weighing device is not in use, the rod sections and the fittings may be placed in the container. With the cap in place the receptacle then may be conveniently stored until use is required.

When the weighing device is to be used, the cap is unscrewed from the container and the rod sections and fittings removed therefrom. Next, the rod sections are assembled into the balancing rod and the rod positioned so that the scale to be used faces upward. The fitting fasteners then are threaded into the apertures in the manner noted above. Lastly, the container is filled with water to a predefined level depending on the scale being used, the cap replaced and the cap loop fitted over the rod outer end section.

With assembly of the weighing device complete, an object to be weighed may be attached to the object fitting and the weighing device and attached object supported from the pivot fitting. The position of the receptacle loop then is moved along the balancing rod until the rod assumes a substantially horizontal position. More exact positioning may be obtained by observing and then locating the air bubble in the level between a set of provided level indicating lines. The position of the receptacle cord loop with respect to numerical values on the scale indicates the weight of the object.

The weighing device of this invention provides several advantages over other known weighing devices.

A first advantage is that the device has a non-use configuration which is compact and light weight. Thus, the device is easy to store and is readily portable. For example, the weighing device may be conveniently stored in a tackle box of a sport fisherman and then carried to remote locations.

A second advantage is that this weighing device has a simplified structure allowing it to be readily manufactured at a reasonable cost. Thus, the device may be priced for purchase by most all persons in need of a weighing device.

A next advantage is that the device may be readily assembled for use and is easy to use. As water serves the major component of the counterweight to the object, this inventive weighing device may be used anywhere water is available. The water used may be salt or fresh. The difference in specific gravity between salt and fresh water is too small to affect the accuracy of this device.

A still further advantage is that device is reliable as the components may be fabricated from corrosive resistant material such as plastic. Thus, the accuracy of this weighing device is not affected over time by environmental elements. The accuracy of the device typically is in a range of +/− one ounce. When one chooses to use the level and is careful in filling the container, even greater accuracy is obtainable.

A last advantage is that this weighing device has two weighing modes, a light weighing mode from 1 to 10 pounds and a heavy weighing mode from 2 to 30 pounds, for example. Having two operating modes improves the accuracy of the device over the entire weighing range in that it allows the user to more easily read the scale numerical values. The mode of use may be readily changed simply ty rotating the position of the balancing rod scales, inverting the position of the fittings, and changing the level of the water in the receptacle.

DESCRIPTION OF THE DRAWINGS

FIG. 1 is a side elevation view of a portable weighing device of this invention as assembled.

FIG. 2 is a detailed side elevation view of a receptacle of the weighing device of FIG. 1 shown with its container and cap portions disassembled.

FIG. 3 is a side elevation view of a pivot end section of a balancing rod of the weighing device.

FIG. 4 is a view of a heavy weighing scale side of a middle section of the rod.

FIG. 5 is a view of a light weighing scale side of an outer end section of the rod.

FIG. 6 is an end view of the container portion with the rod sections stored therein when the device is not in use, for example.

DESCRIPTION OF THE PREFERRED EMBODIMENT

A portable weighing device of this invention is shown in its assembled form in FIG. 1 and designated 10. As seen, the device 10 includes a balancing rod 12 comprising an interconnected rod pivot end section 14, a rod middle section 16, and a rod outer end section 18. These rod sections 14-18 are shown in detail in FIGS. 3-5, respectively.

The rod pivot end section 14 has a cylindrical shaped body defined by a solid portion 20 which connects with a hollow portion 22. In the solid portion 20 is a threaded object aperture 24 and an inward spaced threaded pivot aperture 26. These apertures 24,26 extend between a heavy weighing scale side 28 and a light weighing scale side 30 of the rod pivot end section 14. The rod pivot end section 14 further includes a set of internal threads 34 formed in the hollow portion 22 adjacent to an inner end 36 of such.

The balancing rod middle section 16 also has a cylindrical shaped body formed with external threaded ends 38,40. In a center of the rod middle section 16 is a cavity 40 forming part of a liquid-air bubble type level 44. This cavity 40 extends through the rod middle section 16 and is enclosed by a pair of glass covers 46 which align respectively with a heavy weighing and light weighing scale side 48,50 of this middle section 16. In FIG. 4 only the heavy weighing scale side 48 is shown. Each cover 46 is formed with a set of level indicating lines 52. When the middle section 16 is in a horizontal position an air bubble 54 resides between these lines 52.

The outer end section 18 of the weighing device balancing rod 12 in a like manner has a hollow cylindrical body with internal threads 56 formed adjacent to an inner end 58 of such. The outer end section 18 further included a pair of outward projecting dimples 60 located adjacent to an outer end 62 and positioned respectively between a heavy weighing and light weighing scale side 64,66 of the rod outer end section 18.

The weighing device 10 additionally included a receptacle 68 preferrably made of a non-corrosive material such as a clear plastic. The receptacle 68 comprises a container portion 70 and a cap portion 72. The container portion 70 has a hollow cylindrical body 74 with a closed bottom end 76 and an open top end 78 providing access to an inner space 80. About the top end 78 are external threads 82 for selective assembly with complementarily formed internal threads in the cap 72. Attached to a lip 84 of the cap 72 is a cord loop 86.

Lastly, the weighing device 10 includes a set of fittings. A first pivot fitting 88 of this set comprises an eyelet fastener 90 with a cord loop 92 attached to the fastener 90. A second pivot fitting 94 of this set comprises an eyelet fastener 96 and a hook 98 joined together by a further cord loop 100.

As seen in FIG. 6, during periods of nonuse the balancing rod sections 14-18 may be disassembled and conveniently placed in the inner space 80 of the receptacle container 70. While not shown, there is also sufficient room in the container 70 for the fittings 88,94. With the cap 72 secured to the container 70, the assembled receptacle 68 may be conveniently stored, for example in a fishing tackle box for subsequent assembly and use.

When the weighing device 10 is to be used, first the cap 72 is unscrewed from the container 70. The rod sections 14-18 and the fittings 88,94 then may be removed from the container 70. Next, these rod sections 14-18 may be formed into the balancing rod 12 by assembling the external threaded ends 38,40 of the rod middle section 16 with the internal threads 34 of the rod pivot end section 14 and the internal threads 56 of the rod outer end section 18 respectively.

Further assembly depends on whether the weighing device 10 is to be used in its heavy weighing mode (2 to 30 lbs.) or light weighing mode (1 to 10 lbs.), for example. It should be understood that other weight ranges are possible. The above ranges were chosen as being particularly adaptable for use by sport fishermen. On the heavy weighing scale sides 28,48 and 64 of the rod sections 14-18 is a heavy weighing scale 104 comprising a series of spaced numerical values representing weights in the range noted above. As seen in FIG. 4, several weight values of the heavy weighing scale 104 are shown and designated 106. On the light weighing scale sides 30,50 and 66 of the rod sections 14-18 is a light weighing scale 108 having a set of like but smaller numerical weight values. As seen in FIG. 5, several of these smaller weight values are shown and designated 110.

Assuming that the weighing device 10 is to be used in its heavy weighing mode, the eyelet fastener 90 of the pivot fitting 88 is threaded into the pivot aperture 26 of the rod pivot end section 14. As seen in FIG. 1, the eyelet portion of the fastener 90 and cord loop 92 are on the heavy weighing scale side 28 of the rod pivot section 14 and therefore project upward. The eyelet fastener 96 of the object fitting 94 then is threaded into the object aperture 24 so that the hook and cord loop 98,100 drop downward from the light weighing scale side 28 of the rod pivot end section 14. Where the weighing device 10 is to be used in its light weighing mode, the balancing rod 12 is positioned so that the light weighing scale 108 faces upward. The fittings 88,94 then are threaded into the apertures 24,26 in a similar manner.

Next, the container 70 of the receptacle 68 is filled with water to a level designated by a heavy weighing level line 112 formed on the container 70. This water may be fresh or salt. The specific gravity difference between salt and fresh water is so small that the accuracy of the device 10 is only minimally affected. Where the device 10 is to be used in its light weighing mode, the container 70 is filled to a level aligning with a light weight level line 114 on the container 70. When the container 70 has been so filled, the cap 72 is threaded onto the container 70 and the balancing rod 12 inserted through the cord loop 86 of the cap 72. The weighing device 10 is now ready to weigh an object such as a recently caught fish (not shown).

During weighing the device 10 is supported by the pivot fitting cord loop 92 which may be hand held or attached to some readily available support member. An object to be weighed then is attached to the hook 98. Next, the position of the receptacle 68 is moved along the scale, for example, the heavy weighing scale 104, until the rod 12 balances in a generally horizontal position. Note that the dimples 60 help prevent the cap cord loop 86 from coming off the rod outer end section end 62.

Then, observing the air bubble 54 in the level 44, the position of the receptacle 68 is finely adjusted to locate the bubble 54 between the level indicating lines 52. The location of the receptacle cord loop 86 with respect to the scale weight values 106 indicates the weight of the object.

When use of the weighing device 10 is no longer needed, it may be disassembled in a reverse manner as described above. The rod sections 14-18 and fittings 88,94 may be returned to the then emptied container 70. With the cap 72 screwed onto the container 70, the closed receptacle 68 may be stored in some convenient place.

While an embodiment of this invention has been shown and described, it should be understood that this invention is not limited thereto except by the scope of the claims. Various modifications and changes may be made without departing from the scope and spirit of the invention as the same will be understood by those skilled in the art.

What I claim is:

1. A portable weighing device comprising:
   a receptacle including a hollow container with an open end to provide access to an inner space and a cap with an attached cord loop prepared for assembly to said container to close said container open end,
   a rod pivot end section carried in said container inner space,
   a rod middle section carried in said container inner space,
   a rod outer end section carried in said container inner space with said rod sections prepared for removal from said container for selective assembly into a balancing rod having numerical values on one side to define a first weighing scale and further numerical values on an opposite side to define a second weighing scale,
   an object fitting carried in said container inner space and including a fastener prepared for assembly in an aperture formed in said rod pivot end section adjacent to an outer end of such with said aperture extending between said rod section sides, and
   a pivot fitting carried in said container inner space and including a fastener prepared for assembly in an aperture formed in said rod pivot end section spaced inward from said object fastener aperture with said pivot fastener aperture extending between said rod section sides,
   wherein said rod sections and said fittings may be conveniently stored in said receptacle for subsequent removal for selective assembly into said weighing device.

2. A portable weighing device particularly adapted for use by sport fishermen to weigh a recently caught fish, said weighing device comprising:
   a balancing rod defined by a rod pivot end section joined to a rod outer end section by a rod middle section,
   a light weighing scale formed on one side of said rod and a heavy weighing scale formed on an opposite side of said rod,
   a set of threaded apertures formed in said rod pivot end section and extending between said rod sides, said set comprising an object aperture positioned adjacent to an outer end of said section and a pivot aperture positioned inward from said object aperture,
   a set of fittings comprising a pivot fitting having a fastener carried in said pivot aperture to extend upward therefrom and an object fitting having a fastener carried in said object aperture to extend downward therefrom, and
   a receptacle comprising a container having an open end to an inner space and a cap having a cord loop, said cap assembled to said continer open end and said loop carried on said balancing rod on a side of said pivot aperture opposite said object aperture,
   wherein during use of said weighing device said balancing rod may be supported by said pivot fitting, said container may be filled with water to a predefined level depending on whether said balancing rod is positioned to have said light weighing scale or said heavy weighing scale face upward, said fish may be attached to said object fitting, and a position of said receptacle moved along said balancing rod until said rod balances horizontally with a location of said receptacle cap loop with respect to numerical values of said upward facing scale indicating a weight of said fish.

3. A weighing device as defined by claim 2 and further including,
   a liquid-air bubble type level formed in said rod middle section, said level defined in part by a set of transparent covers aligning respectively with said rod scale sides.

4. A weighing device as defined by claim 2 and further characterized by,
   a set of dimples formed on an outer end of said rod outer end section to help locate said receptacle cap cord loop.

5. A weighing device as defined by claim 2 and further characterized by,
   said object fitting including a hook for attaching said fish with said hook joined to said fastener by a cord loop, and
   said pivot fitting including a cord loop joined to said fastener for holding said weighing device during use thereof.

* * * * *